J. H. STREETER.
ADJUSTABLE STEERING WHEEL FOR AUTOMOBILES.
APPLICATION FILED FEB. 25, 1915.
1,174,908.
Patented Mar. 7, 1916.
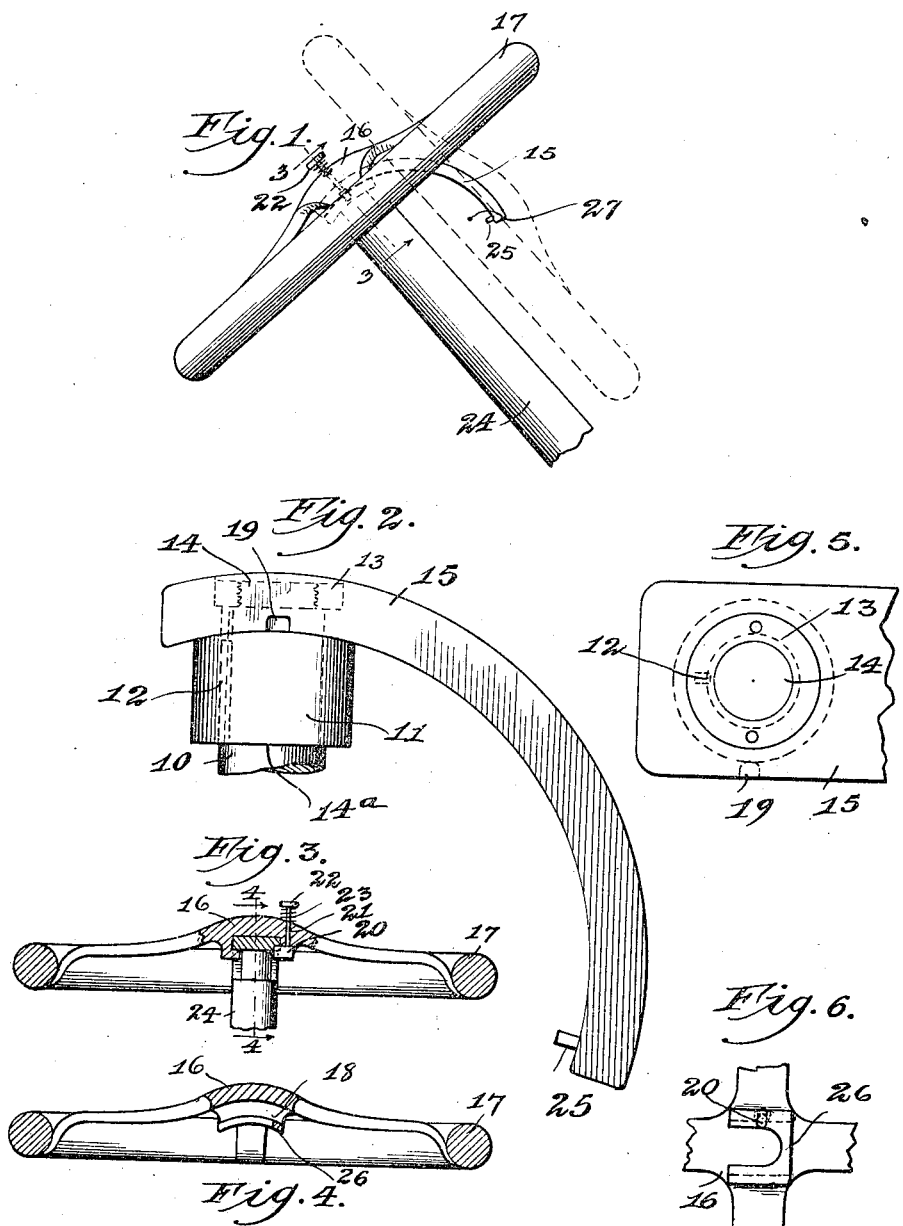

UNITED STATES PATENT OFFICE.

JOHN HENRY STREETER, OF BOYNE CITY, MICHIGAN.

ADJUSTABLE STEERING-WHEEL FOR AUTOMOBILES.

1,174,908.  Specification of Letters Patent.  Patented Mar. 7, 1916.

Application filed February 25, 1915. Serial No. 10,430.

*To all whom it may concern:*

Be it known that I, JOHN H. STREETER, a citizen of the United States, residing at Boyne City, in the county of Charlevoix and State of Michigan, have invented certain new and useful Improvements in Adjustable Steering-Wheels for Automobiles, of which the following is a specification.

My invention relates to improvements in adjustable steering wheels for automobiles, and is particularly well fitted for use on cars upon which the control levers are situated below the steering wheel.

The principal object of my invention is to produce a simple, economical and efficient construction, in which the steering wheel of an ordinary automobile may be pushed forward out of the way of the driver, so as to provide space for the passenger or driver to enter or leave the car without serious inconvenience.

As before referred to, the invention is particularly well fitted for use in connection with cars in which the control levers, spark, gas, etc., are located on the steering column beneath the wheel. With my construction the steering wheel, although normally locked tightly in position at right angles upon the head of the steering shaft, may instantly be released and pushed forward into such position that the wheel lies substantially parallel with the column and a considerable distance to the front thereof. In this position the maximum space for the passengers to pass behind the column is provided.

In the drawings which accompany this application—Figure 1 is an elevation of a preferred embodiment of my invention, the full line position of the steering wheel showing its normal operative position, and the dotted lines showing its position when pushed forward out of the way of the occupants of the car; Fig. 2 is an elevation of the arc-shaped tongue secured upon the top of the steering shaft; Fig. 3 is a section taken along the line 3—3 of Fig. 1; Fig. 4 is a section of the steering wheel only, and taken along the line 4—4 of Fig. 3; Fig. 5 is a fragmentary plan view of the top of the parts shown in Fig. 2; and Fig. 6 is a fragmentary under side view of the central portion of the steering wheel.

Referring to the drawings, it will be noted that upon the top of the steering shaft 10 I mount a substantial hub or collar 11, relative rotation of said parts being prevented in any suitable manner, such as by means of a key 12. Said collar 11 is also held in position axially of the shaft 10 by means of a circular sunken nut 13 threaded upon the reduced upper end 14 of the steering shaft 10, which nut forces the part 11 tightly in contact with the shoulder 14ª formed by reducing the end of the shaft 10 to enter the hole in the collar. Upon the upper end of the collar 11 there is integrally formed, preferably by drop forging, an arc-shaped piece of metal 15 which is rectangular in section throughout its length. Said arc-shaped piece 15 projects forwardly of the steering column when the wheel is adjusted for straight line movement of the car.

The hub 16 of the steering wheel 17, instead of being apertured in the usual manner, is machined out by milling or in any other approved manner, so as to fit slidably upon the arc-shaped tongue 15, which is an easy fit in the arc-shaped slot 18 thus provided in the under side of said hub; said slot 18, as shown in Figs. 4 and 6, is closed at one end but at the other end is notched out to admit the collar 11 when the steering wheel is in its normal operative position. In order to lock the wheel in its normal straight position at right angles to the post, I notch out the under side of the part 15 at 19, said notch being of the proper dimensions to admit a locking dog 20 carried at the lower end of the slidable plunger 21, mounted at one side of the hub of the steering wheel. Said stem 21 at its outer end, which projects from the top of the steering wheel hub, carries a button head 22, and between said head 22 and the top of the hub of the wheel there is inserted a coil compression spring 23 which urges the stem outwardly and thus maintains the locking dog 20 in said notch 19 when it is in register therewith.

Whenever it is desired to move the wheel out of the way of the occupants of the car, the driver presses the button 22, releasing the dog 20 from the notch 19, and may then push the steering wheel forwardly along the arc-shaped tongue 15 until it reaches the position shown in dotted lines in Fig. 1. The front edge of the wheel is prevented from striking the casing 24 of the steering column by a pin 25 which limits its forward movement along the tongue 15, said pin engaging the closed end 26 of the slot 18. When the occupants of the car are again properly seated, the steering wheel may be practically instantaneously returned to its normal position at right angles to the post, the locking dog 20 seating itself automatically in the notch 19 as soon as the wheel reaches its central normal position.

It is apparent from the above description that my construction can be manufactured extremely cheaply, and that it is an extremely simple and efficient design which is particularly well fitted to stand up under the severe operating conditions usually encountered when operating automobiles. From the standpoint of convenience, it also possesses peculiar merit, since with this construction the horizontal diameter of the wheel, drawn through the point 27, is moved a substantial distance in front of the steering column, and so a maximum amount of space is given for the occupants of the car to move around in when seating themselves in or leaving the car. Owing to the arcuate shape of the tongue 15, said part is not at all obtrusive and does not detract from the appearance of the car, nor does it noticeably interfere with the operation of the control levers.

Although I have described what I consider to be a preferred embodiment of my invention, it should be understood that certain of the structural details may be modified considerably without departing from the spirit of the invention; hence, I do not wish to be limited, except as specified in the appended claims.

I claim:

1. The combination of an upwardly projecting automobile steering wheel shaft, a head rigidly secured to the top of said shaft, a wheel having its interior portion slidably interlocked with said head, the coöperating sliding surfaces of said head and wheel being arcuate in shape with a common center below the head, and adapted to permit an arcuate bodily sliding movement of said wheel with respect to said head.

2. The combination of an upwardly projecting automobile steering wheel shaft, an arcuate tongue-shaped head rigidly secured to the top of said shaft, a wheel having its hub portion slidingly interlocked with said tongue, the coöperating sliding surfaces of said tongue and hub being arcuate in shape, with a common center below the head, and adapted to permit an arcuate bodily sliding movement of said wheel with respect to said head, and means for automatically locking said wheel in normal position with its plane at right-angles to the axis of said shaft.

3. The combination of an upwardly projecting inclined automobile steering wheel shaft, a collar rigidly secured to the top of said shaft and provided with an integral quadrant-shaped tongue, the center of the quadrant being located below the collar and substantially in the axis of said shaft, a steering wheel provided with a depending hub portion interlocked with and slidable along said quadrant, and a spring-engaged dog member carried by one of said parts and adapted automatically to engage the other of said parts to lock the wheel in its normal position on said quadrant, with its plane substantially at right angles to the axis of said shaft.

JOHN HENRY STREETER.

Witnesses:
 OMER C. JONES,
 K. GERRIE.